US010449998B2

(12) United States Patent
Knoll et al.

(10) Patent No.: US 10,449,998 B2
(45) Date of Patent: Oct. 22, 2019

(54) APPARATUS FOR INTRODUCING AN AUXILIARY TORQUE INTO A STEERING SHAFT OF AN ELECTROMECHANICAL POWER STEERING SYSTEM

(71) Applicants: THYSSENKRUPP PRESTA AG, Eschen (LI); thyssenkrupp AG, Essen (DE)

(72) Inventors: Peter Knoll, Lindau (DE); Gernot Ernstson, Feldkirch (AT)

(73) Assignees: THYSSENKRUPP PRESTA AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 15/545,877

(22) PCT Filed: Sep. 22, 2015

(86) PCT No.: PCT/EP2015/071733
§ 371 (c)(1),
(2) Date: Jul. 24, 2017

(87) PCT Pub. No.: WO2016/119923
PCT Pub. Date: Aug. 4, 2016

(65) Prior Publication Data
US 2018/0015944 A1    Jan. 18, 2018

(30) Foreign Application Priority Data
Jan. 28, 2015    (DE) .......................... 10 2015 000 928

(51) Int. Cl.
*B62D 5/04*    (2006.01)
*B62D 6/10*    (2006.01)
(Continued)

(52) U.S. Cl.
CPC ......... *B62D 5/0415* (2013.01); *B62D 5/0409* (2013.01); *B62D 6/10* (2013.01);
(Continued)

(58) Field of Classification Search
CPC .... B62D 5/0409; B62D 6/10; B62D 15/0225; B62D 15/0215; G01M 13/02; G01M 13/021
See application file for complete search history.

(56) References Cited

U.S. PATENT DOCUMENTS 5,003,836 A * 4/1991 Mitsugu ............... B60N 2/0224
324/174
6,354,395 B1 * 3/2002 Cheng .................. B62D 5/0409
180/444
(Continued)

FOREIGN PATENT DOCUMENTS

CN    103822740 A    5/2014
DE    19840895 A    3/2000
(Continued)

OTHER PUBLICATIONS

English translation of International Search Report issued in PCT/EP2015/071733 dated Dec. 17, 2015 (dated Jan. 5, 2016).
(Continued)

*Primary Examiner* — Joseph M Rocca
*Assistant Examiner* — Michael R Stabley
(74) *Attorney, Agent, or Firm* — thyssenkrupp North America, Inc.

(57) ABSTRACT

An apparatus for introducing an auxiliary torque and/or an additional steering angle into a steering shaft of an electromechanical power steering system may comprise a gearwheel that is attached fixedly on the steering shaft so as to rotate with the steering shaft and that is operatively connected to a drive element of a drive motor for driving the
(Continued)

gearwheel. The apparatus may further include a sensor that is connected fixedly to the steering shaft so as to rotate with the steering shaft. So that the attachment of the sensor can take place with less complexity and use less installation space as far as possible, the sensor and the gearwheel may be connected to one another at contact faces.

18 Claims, 2 Drawing Sheets

(51) Int. Cl.
    *B62D 15/02*     (2006.01)
    *G01L 3/10*     (2006.01)
    *G01L 5/22*     (2006.01)
    *G01D 11/24*     (2006.01)

(52) U.S. Cl.
    CPC ..... *B62D 15/0215* (2013.01); *B62D 15/0235* (2013.01); *G01L 3/104* (2013.01); *G01L 5/221* (2013.01); *B62D 5/0454* (2013.01); *G01D 11/245* (2013.01)

(56) References Cited

U.S. PATENT DOCUMENTS

| | | | |
|---|---|---|---|
| 6,805,017 B2* | 10/2004 | Chikaraishi | B62D 5/0409 180/443 |
| 7,204,167 B2* | 4/2007 | Chikaraishi | B62D 5/0409 180/444 |
| 7,798,033 B2* | 9/2010 | Oberle | B62D 5/0409 74/388 PS |
| 2002/0030458 A1 | 3/2002 | Weber | |
| 2003/0214284 A1 | 11/2003 | Okumura | |
| 2005/0217923 A1 | 10/2005 | Onizuka | |
| 2005/0230178 A1 | 10/2005 | Chikaraishi | |
| 2005/0236222 A1* | 10/2005 | Chikaraishi | B62D 5/0409 180/444 |
| 2006/0213717 A1* | 9/2006 | Chikaraishi | B62D 5/0409 180/444 |
| 2007/0080016 A1* | 4/2007 | Onizuka | B62D 5/0409 180/444 |
| 2007/0209864 A1* | 9/2007 | Segawa | B62D 5/0403 180/446 |
| 2008/0245600 A1* | 10/2008 | Chikaraishi | B62D 15/0215 180/444 |
| 2014/0042208 A1* | 2/2014 | Uchida | B23K 31/125 228/103 |
| 2014/0292315 A1 | 10/2014 | Antoni | |
| 2014/0339011 A1* | 11/2014 | Beyerlein | B62D 3/04 180/444 |
| 2017/0096162 A1* | 4/2017 | Fuechsel | B62D 5/0409 |

FOREIGN PATENT DOCUMENTS

| | | |
|---|---|---|
| DE | 102007022282 A | 11/2008 |
| DE | 102009028828 A | 3/2011 |
| DE | 102010033769 A | 2/2012 |
| DE | 102012215081 A | 2/2013 |
| DE | 102011118642 A | 5/2013 |
| EP | 1362766 A | 11/2003 |
| EP | 1495942 A | 1/2005 |
| EP | 1541299 A | 6/2005 |
| GB | 2421717 A | 7/2006 |
| JP | 2007216959 A | 8/2007 |

OTHER PUBLICATIONS

English abstract for DE102007022282A.
English abstract for DE102009028828A.
English abstract for DE102010033769A.
English abstract for DE102011118642A.
English abstract for DE102012215081A.

* cited by examiner ically for the disclosure is not limited to this.

APPARATUS FOR INTRODUCING AN AUXILIARY TORQUE INTO A STEERING SHAFT OF AN ELECTROMECHANICAL POWER STEERING SYSTEM

CROSS REFERENCE TO RELATED APPLICATIONS

This application is a U.S. National Stage Entry of International Patent Application Serial Number PCT/EP2015/071733, filed Sep. 22, 2015, which claims priority to German Patent Application No. DE 10 2015 000 928.1 filed Jan. 28, 2015, the entire contents of both of which are incorporated herein by reference.

FIELD

The present disclosure generally relates to electromechanical power steering systems.

BACKGROUND

In a steering system of a motor vehicle which is configured as an electromechanical power steering system, an auxiliary torque and/or an additional steering angle are/is additionally coupled into the steering shaft by an electric drive in a manner which is dependent on the steering angle and the steering torque which the driver exerts on the steering wheel. The apparatus of the generic type serves for this purpose, which apparatus has a gear mechanism which makes it possible to transmit an auxiliary torque which is produced by the electric drive motor to the steering shaft. In preferred embodiments, the gearwheel on the steering shaft is configured as a worm gear to this end, which worm gear meshes with a worm on the output of the drive motor.

The steering torque is determined by means of a torque sensor, to be precise specifically by way of measurement of the relative rotational angle between a steering wheel-side input shaft and a steering gear-side output shaft which are connected to one another in a rotationally elastic manner via a torsion rod (torsion bar) with a defined torsional stiffness. The relative rotational angle and the steering angle, that is to say the absolute angular position of the steering lock, are determined by means of a sensor arrangement which comprises a sensor element which is connected fixedly to a section of the steering shaft so as to rotate with it, for example a magnet arrangement which acts as a transmitter. The angular position of the sensor element is detected by way of an electronic sensing element which is stationary relative to the rotatable steering shaft, forms an assembly, detects, for example, a magnetic field of the sensor element which is dependent on the rotational angle, and outputs it as an electric measurement signal. The measurement signal is input into a regulator which actuates the electric drive of the electromechanical power steering system and thus defines the auxiliary torque which is to be introduced.

It is known in the prior art to arrange the sensor arrangement for angle measurement in an apparatus of the generic type for introducing an auxiliary torque, to be precise, in particular, the sensor element which is connected to the steering shaft. DE 10 2009 028 828 A1, for example, discloses configuring a fitting face on the steering shaft, on which fitting face a sensor element is shrink-fit thermally in order to form an interference fit. However, the fitting face necessarily requires installation space which is available only to a limited extent in an apparatus for introducing an auxiliary torque; in addition, the production of a fitting face is disadvantageously associated with an additional machining step. Moreover, sensor elements with fastening elements made from plastic can be fastened permanently and securely by means of an interference fit only to a limited extent. DE 10 2007 022 282 A1 describes a further possibility for fastening, namely adhesively bonding the sensor element fixedly on the steering shaft by means of a UV-curable adhesive. Here, however, installation space likewise has to be available, and the adhesive bonding is costly in terms of work and time. Finally, DE 10 2011 118 642 A1 has disclosed, instead of a fitting face, first of all attaching a plastic part on the steering shaft, for example by way of press joining, connecting in a positively locking manner or injection molding, to which plastic part a plastic element of the sensor element is then connected in an integrally joined manner. In the case of this procedure, a relatively large amount of installation space is likewise needed. Moreover, the production and machining complexity for the provision and attachment of the additional plastic element on the steering shaft is likewise relatively high.

In view of the above-described problems in the prior art, it is an object of the present invention to improve an apparatus of the type mentioned at the outset, in such a way that the attachment of a sensor element can take place with less complexity and less installation space as far as possible is used.

DETAILED DESCRIPTION

Figure 1:
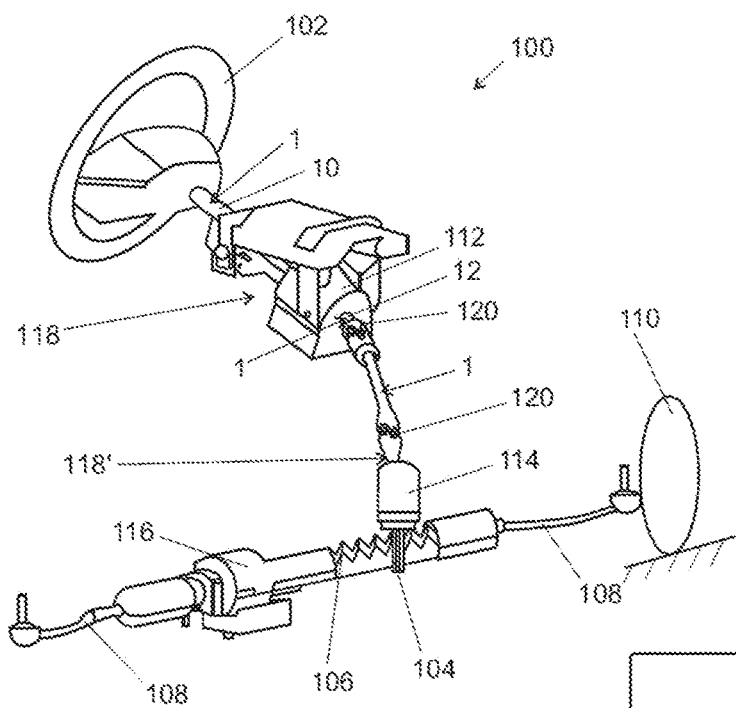
FIG. 1 is a diagrammatic perspective view of an example steering system of a motor vehicle having a power assistance means.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an apparatus for introducing an auxiliary torque and/or an additional steering angle into a steering shaft of an electromechanical power steering system, comprising a gearwheel that may be attached fixedly on the steering shaft so as to rotate with it, is operatively connected to a drive element of a drive motor, and can be driven rotationally by the latter, and a sensor that may be connected fixedly to the steering shaft so as to rotate with it.

In order to solve the abovementioned problem, it is proposed according to the invention that the sensor element and the gearwheel are connected to one another at contact faces.

According to the invention, the sensor element is first of all connected directly to the gearwheel, usually a worm gear, which is always present in an apparatus for introducing an auxiliary torque of the type mentioned at the outset, and a dedicated connection between the gearwheel and the steering shaft and between the sensor element and the steering shaft does not in each case take place, as in the prior art. In other words, in the region of its contact face, the sensor element bears with its surface directly against the surface in the region of the contact face of the gearwheel. The connection accordingly takes place via a joining connection in the region of the contact faces, in which region the sensor element and the gearwheel are in contact. As a consequence, a separate fastening device does not have to be provided on the steering shaft for receiving the sensor element, as is required in the prior art. Accordingly, the gearwheel and the sensor element can be arranged as closely to one another as possible, with the result that a particularly small amount of installation space is used. Moreover, the additional machining of the steering shaft which is required in the prior art to configure a receptacle for the sensor element can be dispensed with. As a result, the production complexity and the associated costs are advantageously reduced.

One particularly advantageous embodiment of the invention provides that the sensor element is connected to the gearwheel in an integrally joined manner. Accordingly, an integrally joined connection is realized in the region of the contact faces, which integrally joined connection forms a permanent, non-releasable connection which is particularly durable and can be separated only by way of destruction of the parts which are connected to one another. The integrally joined connection has the advantage, furthermore, that no complicated machining or preparation of the surfaces of the sensor element and the gearwheel in the region of the contact faces is required and, moreover, a particularly compact overall design can be realized.

An integrally joined connection is preferably realized by virtue of the fact that the gearwheel is welded to the sensor element. The welding takes place by the material of the gearwheel and of the sensor element being melted locally at the adjoining surfaces in the region of the contact faces by way of the input of heat and connecting in the melting phase, with the result that an approximately homogeneously continuous material structure is configured after cooling, that is to say in practice a single-piece structural element is produced. The welding can take place, for example, by way of ultrasonic welding or friction welding, the contact faces which bear against one another being moved relative to one another at a high frequency and the frictional heat which is produced locally in the process ensuring the actual welding operation. This is a tried and tested standard process which makes a reliable integrally joined connection possible with low complexity and short cycle times. As an alternative, a laser welding operation can take place which likewise makes rapid and secure connection possible, in particular even in the case of different and/or complex component geometries of the elements to be connected.

As an alternative, it is conceivable that the gearwheel is adhesively bonded to the sensor element. In the case of this type of integrally joined connection, an adhesive is inserted between the contact faces, which adhesive, after curing, adheres to the materials of the connecting partners in an optimum manner. The production complexity in the case of adhesive bonding is relatively low, the strength and durability of the adhesive bond being high.

The gearwheel and the sensor element are preferably configured from plastic in each case at least in the region of the respective contact face. Here, at least the surfaces of the gearwheel and sensor element which bear against one another in the region of the contact faces, that is to say the joining faces, can consist of plastics which are compatible with one another with regard to an integrally joined connection. This means that the gearwheel and the sensor element are produced completely or partially from plastic materials which suit one another with regard to the parameters which define the strength of an integrally joined connection, such as material-specific adhesion behavior, surface finish, etc. As a result, a welded connection can be produced, for example by means of ultrasonic or laser welding, with the same strength as the plastics themselves. It is a further particular advantage that the use of gearwheels made from plastic in apparatuses of the generic type is known and tried and tested, with the result that the plastic from which the enclosure or the housing of the sensor element has to be adapted substantially to it in terms of its properties, in order to realize an optimum connection.

The gearwheel is preferably molded onto the steering shaft as a plastic injection molded part. Here, the steering shaft which as a rule consists of steel is positioned in an injection mold and is embedded non-releasably into the plastic which is injected in liquid form, via an integrally joined connection. Additional positively locking elements can preferably be provided on the section of the steering shaft, which additional positively locking elements further increase the strength of the connection and simplify a reproducible relative orientation of the toothed rim and the steering shaft. In the arrangement according to the invention, the plastic/steel connection which is formed in this way and is particularly durable is used for the integration of the sensor element into an apparatus of the generic type by means of an integrally joined plastic/plastic connection which can be produced simply and is particularly secure.

It is expedient that the sensor element has an annular basic shape which is arranged coaxially on the steering shaft and has a substantially annularly extending contact face. In a sensor arrangement which is known in the prior art, the annular basic shape results from magnetic flux conductors which are arranged distributed over the circumference in a manner which is coaxial about the steering shaft. Said flux conductors are preferably arranged in a main body or housing made from plastic which has the surface for connecting to the gearwheel, that is to say the contact or joining face. This can be of annularly circumferential configuration, as a result of which optimum positioning and reliable fastening of the sensor element can be ensured with low production complexity.

The gearwheel and the sensor element can preferably bear axially against one another in the region of the contact faces. Here, the contact faces have axial faces which are realized by virtue of the fact that surfaces which correspond with one another and can be brought into contact with one another in the axial direction are provided as joining faces on the gearwheel and on the sensor element, for example an axial annular face which is connected to a circumferential shoulder or an axial end face. One advantage of said arrangement is that the gearwheel in any case has a disk-shaped basic shape, on which suitable axial faces can be configured simply as contact faces. A further advantage is that the contact faces which bear against one another are particularly satisfactorily accessible for a welding operation by means of ultrasonic welding. The excitation which is required for welding can namely take place by way of an annular or tubular section-shaped sonotrode which is guided coaxially via the steering shaft and presses the sensor element axially against the gearwheel.

In one advantageous refinement, the sensor element and the gearwheel have positively locking elements which can be brought into engagement with one another in a positively locking manner. Said positively locking elements serve for relative positioning, in particular for centering of the sensor element relative to the gearwheel and therefore relative to the steering shaft. For example, a positively locking element can be formed by way of a projection which projects axially out of the gearwheel and onto which an annular main body of a sensor element can be pushed axially. While the sensor element is positioned in the radial direction on the projection, that is to say is centered, it is positioned in a radially defined manner in the assembly position when it comes into contact axially with the surface, that is to say that contact face on the gearwheel which lies axially opposite. Therefore, clearly defined, exact positioning of the sensor element relative to the gearwheel is ensured while carrying out integrally joined fastening, for example by way of welding or adhesive bonding.

It is advantageous, furthermore, that the gearwheel and the sensor element are arranged in a housing, on which an assembly of a sensor arrangement is positioned such that it is stationary relative to the sensor element. The assembly can serve to receive measured signals of the sensor element, and can be configured as a sensing element for detecting angular adjustments of the sensor element, for example as a magnetic field sensor for a sensor element with an angle-dependent magnet arrangement. The assembly is arranged fixedly on the body of the vehicle via the housing of the apparatus relative to the rotatable sensor element and therefore makes it possible to detect relative angular changes during a rotation of the steering shaft. A particularly compact overall design of the apparatus can be realized by way of the integration of the assembly.

The object is likewise achieved by way of a method in accordance with claim 11.

A method is proposed for producing an apparatus for introducing an auxiliary torque and/or an additional steering angle into a steering shaft of an electromechanical power steering system, the method comprising the following method steps: provision of a gearwheel for an electromechanical power steering system, provision of a sensor element for a sensor arrangement, positioning of the sensor element at or on the gearwheel in a predefined arrangement position, production of a non-releasable connection between the sensor element and the gearwheel.

During the positioning of the sensor element at and/or on the gearwheel, the sensor element is moved into the position in which the sensor element is to be fixed, that is to say is to be connected to the gearwheel. The positioning preferably takes place by way of the sensor element being pushed or pressed onto a projection of the gearwheel. Here, the pushing or pressing on of the sensor element can preferably take place with full contact, that is to say as far as a stop. This affords the advantage that the sensor element can be positioned without particular complexity.

The production of the non-releasable connection between the sensor element and the gearwheel preferably takes place in an integrally joined manner. This can take place, for example, by way of laser welding, ultrasonic welding or by way of adhesive bonding.

FIG. 1 diagrammatically shows a motor vehicle steering system 100, it being possible for a driver to introduce a corresponding steering moment (steering torque) into a steering shaft 1 via a steering wheel 102 as a steering command. The steering torque is transmitted via the steering shaft 1 to a steering pinion 104 which meshes with a rack 106 which then for its part transmits the predefined steering angle to the steerable wheels 110 of the motor vehicle via a displacement of the track rods 108.

An electric power assistance means can be provided in the form of a power assistance means 112 which is coupled to the steering shaft 1 on the input side, a power assistance means 114 which is coupled to the pinion 104, and/or a power assistance means 116 which is coupled to the rack 106. The respective power assistance means 112, 114 or 116 couples an auxiliary torque into the steering shaft 1 and/or the steering pinion 104 and/or an auxiliary force into the rack 106, as a result of which the driver is assisted during the steering work. The three different power assistance means 112, 114 and 116 which are shown in FIG. 1 show possible positions for arranging them.

Only a single one of the shown positions is usually fitted with a power assistance means 112, 114 or 116. The auxiliary torque or the auxiliary force which is to be applied by means of the respective power assistance means 112, 114 or 116 in order to assist the driver is defined with the consideration of a steering torque which is introduced by the driver and is determined by a torque sensor 118. As an alternative to or in combination with the introduction of the auxiliary torque, an additional steering angle can be introduced into the steering system by the power assistance means 112, 114, 116, which additional steering angle is summed with the steering angle which is applied by the driver via the steering wheel 102.

The steering shaft 1 has, on the input side, an input shaft 10 which is connected to the steering wheel 102 and, on the output side, an output shaft 12 which is connected to the rack 106 via the steering pinion 104. The input shaft 10 and the output shaft 12 are coupled to one another in a rotationally elastic manner via a torsion bar 130 which cannot be seen in FIG. 1 (see FIG. 4). In this way, a torque which is input into the input shaft 10 by a driver via the steering wheel 102 always leads to a relative rotation of the input shaft 10 with regard to the output shaft 12 when the output shaft 12 does not rotate in an exactly synchronous manner with respect to the input shaft 10. Said relative rotation between the input shaft 10 and the output shaft 12 can be measured via a rotary angle sensor, and a corresponding input torque relative to the output shaft 12 can be defined accordingly on the basis of the known torsional stiffness of the torsion bar 130. In this way, the torque sensor 118 is configured by way of the determination of the relative rotation between the input shaft 10 and the output shaft 12. A torque sensor 118 of this type is known in principle and can be, for example, an electromagnetic sensor arrangement, as will be described further below, or can be realized by way of another measurement of the relative rotation.

Accordingly, a steering torque which is applied to the steering shaft 1 or the input shaft 10 by the driver via the steering wheel 102 will bring about the input of an auxiliary torque by way of one of the power assistance means 112, 114, 116 only when the output shaft 12 is rotated relative to the input shaft 10 counter to the rotational resistance of the torsion bar 130.

As an alternative, the torque sensor 118 can also be arranged at the position 118', the break of the steering shaft 1 into the input shaft 10 and the output shaft 12 and the rotationally elastic coupling via the torsion bar 130 then accordingly being present at a different position, in order for it to be possible to determine a relative rotation and therefore correspondingly an input torque and/or an auxiliary torque to be applied from the relative rotation of the output shaft 12 which is coupled to the input shaft 10 via the torsion bar 130.

Furthermore, the steering shaft 1 in FIG. 1 comprises at least one cardan joint 120, by means of which the course of the steering shaft 1 in the motor vehicle can be adapted to the spatial conditions.

Figure 2:
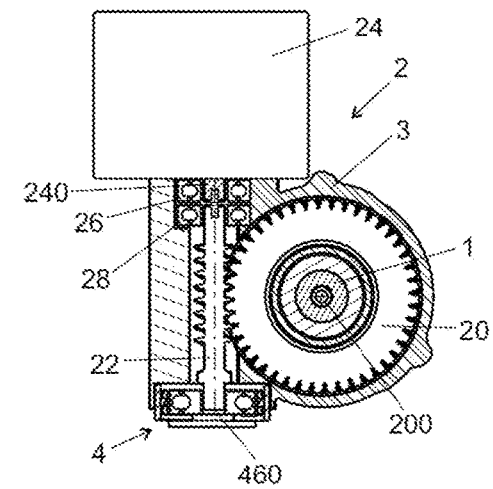
FIG. 2 is a diagrammatic section view through an example apparatus for introducing an auxiliary torque into a steering shaft.

FIG. 2 shows a diagrammatic sectional illustration of an apparatus 2 for introducing an auxiliary torque into a motor vehicle steering system 100. A gearwheel 20 (here, a worm gear) is provided which is connected to a steering shaft 1 which is shown diagrammatically. A rotation of the gearwheel 20 about its rotational axis 200 which is also called a gearwheel or worm gear axis 200 and is configured here by way of the steering shaft 1 brings about the introduction of an auxiliary torque into the steering shaft 1, in order to correspondingly introduce an auxiliary force or an additional steering angle into the steering line.

The gearwheel 20 is driven via a drive worm 22 which for its part is driven via a diagrammatically shown electric motor 24, the output 240 of the electric motor 24 accordingly being coupled to the drive worm 22 for the transmission of torque. Here, the axis of the drive worm 22 and the gearwheel axis 200 do not intersect. The drive worm 22 is preferably produced from hardened steel.

The sectional illustration of FIG. 2 shows a housing 3 of the apparatus 2 for introducing an auxiliary torque, the housing 3 receiving a first anti-friction bearing 26 which radially supports the output shaft 240 of the electric motor 24. Furthermore, a second anti-friction bearing 28 is provided, in which the drive-side end of the drive worm 22 is supported radially.

That end 460 of the drive worm 22 which lies opposite the output 240 of the electric motor 24 is mounted in a bearing apparatus 4 which, in addition to the radial mounting of the drive worm 22, also makes an angular compensation possible.

Figure 3:
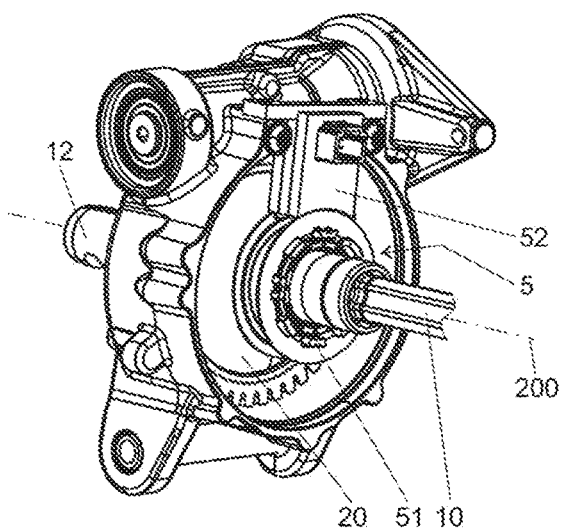
FIG. 3 is a diagrammatic perspective view of the apparatus of FIG. 2 in a state in which it is partially disassembled.
Figure 4:
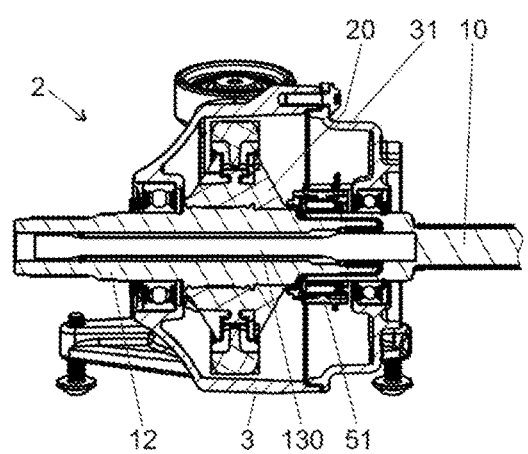
FIG. 4 is a diagrammatic longitudinal section view taken along the longitudinal axis of the steering shaft of an apparatus of FIG. 2.

FIGS. 3 and 4 likewise show the apparatus 2, the housing cover 31 being omitted in the perspective view of FIG. 3 for improved clarity. A sensor arrangement 5 can be seen in said figure, which sensor arrangement 5 comprises a sensor element 51 which is connected fixedly to the gearwheel 20 so as to rotate with it and an assembly 52 which is assigned to said sensor element 51 and is fastened to the housing 3 in a stationary manner relative to the gearwheel 20. The assembly 52 serves firstly to receive a measured signal which is output by the sensor element 51 and to conduct it to a controller, and can secondly be configured and positioned relative to the sensor element 51 in such a way that an angular position of the sensor element 51 relative to the housing 3, and therefore the angular position of the gearwheel 20 and the steering shaft 1, can be measured in this way, for example by the assembly 52 detecting an angle-dependent magnetic field of the sensor element 51.

It can be gathered from the sectional illustration of FIG. 4 that the gearwheel 20 is fastened on the output shaft 12 of the steering shaft 1. The output shaft 12 is connected in a rotationally elastic manner to the input shaft 10 of the steering shaft 1 via the torsion bar 130. In the embodiment which is shown, the sensor element 51 is connected fixedly to the output shaft 12; in alternative embodiments, it can also be connected to the input shaft 10. The input shaft 10 has a magnet arrangement (not shown in detail in the drawing) which is arranged coaxially in the sensor element 51. If a steering torque is introduced into the input shaft 10 by the driver via the steering wheel 102, said input shaft 10 rotates relative to the output shaft 12. Said relative rotation of the magnet arrangement which is dependent on the steering torque which is introduced by the driver is detected by means of the sensor element 51 and is utilized as a control variable for determining the auxiliary torque which is transmitted by the electric motor 24 to the output shaft 12 via the drive worm 22 and the gearwheel 20.

Figure 7:
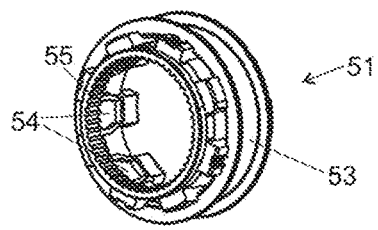
FIG. 7 is a diagrammatic perspective view of an example sensor for an apparatus.

The sensor element 51 which is shown in detail in FIG. 7 has a substantially annular main body 53 which is preferably configured substantially from plastic, preferably as a plastic injection-molded part. Components of the actual electric measuring arrangement can be attached on the main body 53, for example in the form of stator laminations 54 which are distributed over the circumference, are embedded into the plastic, and are indicated merely diagrammatically in the drawing.

Figure 6:
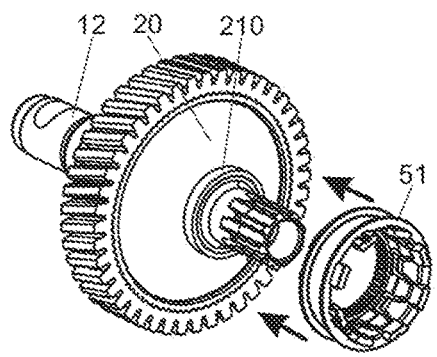
FIG. 6 is a diagrammatic perspective view of the gearwheel of FIG. 5 with a sensor which is shown removed.

The annular main body 53 is placed coaxially onto the steering shaft 1, for example onto the output shaft 12, and is moved in the axial direction against the gearwheel 20, as indicated by way of the arrow in FIG. 6. Here, a tubular shoulder 55 which is configured on the main body 53 on the end side is pushed or pressed in the axial direction in a positively locking manner onto a cylindrical projection 210 which is configured on the gearwheel 20 on the end side, the sensor element 51 being centered relative to the gearwheel 20 and therefore also to the output shaft 12, and there being a certain prestress between the projection 210 and the shoulder 55.

Figure 5:
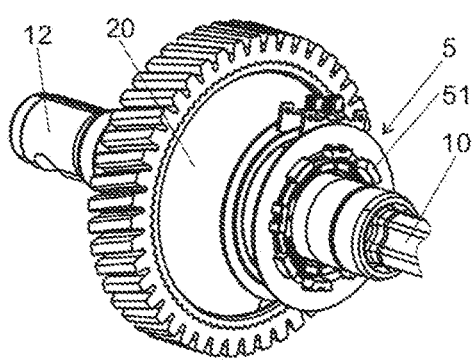
FIG. 5 is a diagrammatic perspective view of an example gearwheel with a mounted sensor.

The end position during the attachment of the sensor element 51 is shown in FIG. 5. The sensor element 51 bears tightly against an axial end side of the gearwheel 20 and forms a compact structure unit. It can be seen in the illustration how the input shaft 10 is inserted with its end which faces the gearwheel 20 axially into the open cross section of the main body 53 of the sensor element 51. As a result of the abovementioned magnet arrangement (not shown in detail) which is attached at the end of the input shaft 10, a relative rotation of the input shaft 10 with respect to the output shaft 12 can be detected by way of the sensor element 51.

Figure 8:
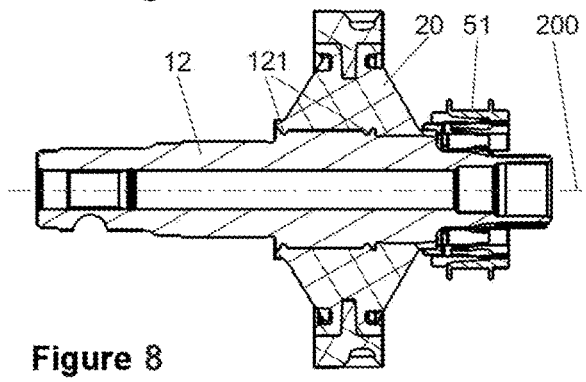
FIG. 8 is a diagrammatic longitudinal section view taken along the longitudinal axis of the steering shaft of a part arrangement from FIG. 5.

FIG. 8 shows a longitudinal section in the direction of the gearwheel axis 200 through the output shaft 12 in a similar manner to FIG. 5, but shows merely the sensor element 51 instead of the complete sensor arrangement 5. It is apparent from this, in particular, how the gearwheel 20 which consists of plastic is attached on the output shaft 12 which preferably consists of steel. The connection can preferably take place by the gearwheel 20 being molded onto the output shaft 20 in an injection mold using plastic injection molding, that is to say the output shaft 12 is encapsulated by the molten plastic material. As shown here, this can take place by means of diaphragm gating or, as an alternative, by means of continuous casting. A fixed integrally joined connection is realized as a result. In addition, the output shaft 12 can have positively locking elements 121 on its outer circumference, for example ribs or grooves which are filled by the plastic and ensure a positively locking connection to the gearwheel 20.

Figure 9:
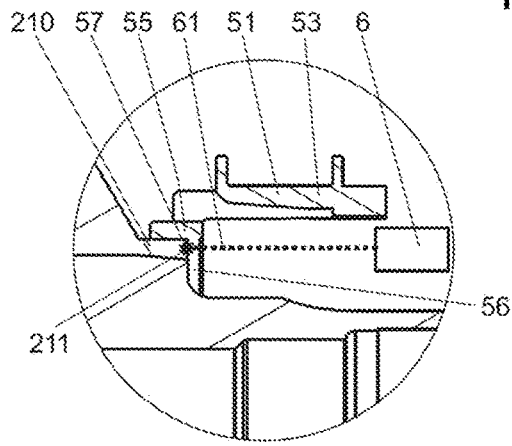
FIG. 9 is a detailed view from FIG. 8 in a first embodiment.
Figure 10:
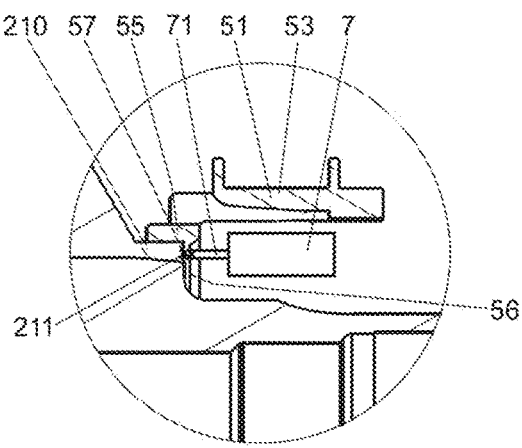
FIG. 10 is a detailed view from FIG. 8 in a second embodiment.
Figure 11:
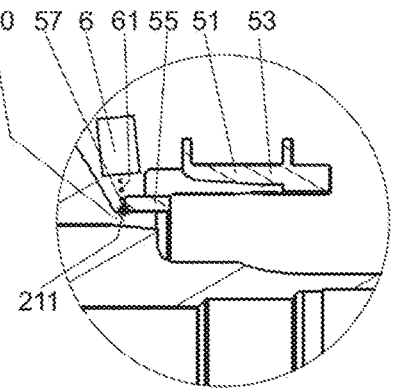
FIG. 11 is a detailed view from FIG. 8 in a third embodiment.

FIGS. 9, 10 and 11 show sectional views from FIG. 8 on an enlarged scale, which sectional views illustrate in detail the connection of the main body 53 which consists of plastic to the gearwheel 20 which likewise consists of plastic. As has already been described above, the tubular shoulder 55 of the sensor element 51 is placed axially onto the projection 210 in a positively locking manner, as a result of which a centering action with regard to the gearwheel axis 200 takes place. Within the opening of the shoulder 55, an annular, axial end face on a radially inwardly projecting projection 56 forms an axial contact face 57. The contact face 57 is connected to a likewise annular, axial end face 211 of the gearwheel 20, that is to say a corresponding contact face 211 of the gearwheel 20. In other words, the contact faces 57 and 211 form the joining faces of the connection between the plastic of the gearwheel 20 and that of the sensor element 51.

One preferred embodiment of the invention provides that the sensor element 51 is connected to the gearwheel 20 in an integrally joined manner. In the embodiment which is shown, the integrally joined connection takes place in the region of the contact faces 57 and 211 which bear axially against one another, the joining faces of the integrally joined connection.

FIG. 9 diagrammatically shows a thermal welding operation by means of a laser 6. To this end, the laser beam 61 which is indicated by way of a dotted line is radiated axially into the projection 56. By virtue of the fact that the sensor element 51 is produced in the region of said projection 56 from a plastic material which is transparent for the laser light which is used, the laser beam 61 exits from the contact face 57 and strikes that contact face 211 of the gearwheel 20 which bears there against said contact face 57. By virtue of the fact that the gearwheel 20 consists in the region of said contact face 211 of a plastic which is not transparent for the laser light which is used, heat is released there which leads to melting of the plastic on both surfaces 57 and 211 and therefore to a welding operation. By virtue of the fact that compatible plastics with regard to an integrally joined connection are used for the gearwheel 20 and the sensor element 51, a particularly fixed, integrally joined connection is realized with an approximately homogeneously continuous plastic structure.

As shown in FIG. 10, it is possible as an alternative, instead of a laser beam, to use an ultrasonic welding unit 7, by way of the sonotrode 71 of which the contact face 57 is pressed axially against the contact face 211 and is welded thermally to the latter by way of the frictional heat which is coupled in by means of ultrasonic excitation. As a result, a durable integrally joined connection is likewise produced between the gearwheel 20 and the sensor element 51.

FIG. 11 diagrammatically shows a thermal welding operation by means of a laser 6. To this end, the laser beam 61 which is indicated by way of a dotted line is radiated in radially. The laser beam 61 strikes the contact face 211 of the gearwheel 20 which is present there. By virtue of the fact that the gearwheel 20, in the region of said contact face 211, and the sensor element 51, in the region of the contact face 57, consist of a plastic which is not transparent for the laser light which is used, heat is released there which leads to melting of the plastic on both surfaces 57 and 211 and therefore to a welding operation. By virtue of the fact that compatible plastics with regard to an integrally joined connection are used for the gearwheel 20 and the sensor element 51, a particularly fixed, integrally joined connection is realized with an approximately homogeneously continuous plastic structure.

As appropriate, the individual features which are shown in the individual exemplary embodiments can be combined with one another and/or exchanged for one another, without departing from the scope of the invention.

LIST OF DESIGNATIONS

1 Steering shaft
10 Input shaft
12 Output shaft
100 Motor vehicle steering system
102 Steering wheel
104 Steering pinion
106 Rack
108 Track rod
110 Steerable wheel
112 Power assistance means
114 Power assistance means
116 Power assistance means
118 Torque sensor
118' Torque sensor
120 Cardan joint
130 Torsion bar
2 Apparatus for introducing an auxiliary torque
20 Gearwheel
200 Gearwheel axis
210 Projection
211 Contact face (joining face)
22 Drive worm
24 Electric motor
26 Anti-friction bearing of the output shaft of the electric motor
28 Anti-friction bearing for the drive worm
29 Bearing apparatus
220 Axis of the drive worm
240 Output of the electric motor
3 Housing
31 Housing cover
4 Bearing apparatus
460 End of the axis 220
5 Sensor arrangement
51 Sensor element
52 Assembly
53 Main body
54 Stator laminations
55 Shoulder
56 Projection
57 Contact face (joining face)
6 Laser
61 Laser beam
7 Ultrasonic welding unit
71 Ultrasonic sonotrode

What is claimed is:

1. An apparatus for introducing at least one of an auxiliary torque or a steering angle into a steering shaft of an electromechanical power steering system, the apparatus comprising:

a gearwheel that is fixedly attached on the steering shaft so as to rotate with the steering shaft, wherein the gearwheel is operatively connected to a drive element of a drive motor configured to rotationally drive the gearwheel;

a sensor that is fixedly connected to the steering shaft so as to rotate with the steering shaft, wherein the sensor and the gearwheel are connected to one another at contact faces, wherein the sensor is integrally connected to the gearwheel; and positively locking elements that engage the sensor and the gearwheel in a positively locking manner, wherein the positively locking elements maintain the sensor in a position relative to the gearwheel at least prior to the sensor being fixedly and integrally connected to the gearwheel.

2. The apparatus of claim 1 wherein the gearwheel is welded to the sensor.

3. The apparatus of claim 1 wherein the gearwheel is adhesively bonded to the sensor.

4. The apparatus of claim 1 wherein the gearwheel and the sensor comprise plastic at least in regions of the contact faces.

5. The apparatus of claim 4 wherein the gearwheel is configured as a plastic injection-molded part that is molded onto the steering shaft.

6. The apparatus of claim 1 wherein the sensor is annular and is disposed coaxially on the steering shaft, wherein the contact face of the sensor extends substantially annularly.

7. The apparatus of claim 1 wherein the gearwheel and the sensor bear axially against one another in a region of the contact faces.

8. The apparatus of claim 1 wherein the sensor and the gearwheel comprise positively locking elements that can engage with one another in a positively locking manner.

9. The apparatus of claim 1 wherein the gearwheel and the sensor are disposed in a housing on which an assembly of a sensor arrangement is positioned in a manner that is fixed relative to the sensor.

10. The apparatus of claim 1 wherein the sensor is connected to the gearwheel such that disconnection of the sensor from the gearwheel would require destruction of at least one of the sensor or the gearwheel.

11. The apparatus of claim 1 wherein the sensor is connected to the gearwheel such that disconnection of the sensor from the gearwheel would require destruction of both the sensor and the gearwheel.

12. A method for producing an apparatus for introducing at least one of an auxiliary torque or a steering angle into a steering shaft of an electromechanical power steering system, the method comprising:

providing a gearwheel for the electromechanical power steering system by molding the gearwheel as a plastic injection-molded part onto the steering shaft in a positive locking manner at least in part by filling ribs or grooves on the steering shaft with plastic of the gearwheel;

providing a sensor for a sensor arrangement;

positioning the sensor at or on the gearwheel in a predefined arrangement position; and producing a non-releasable connection between the sensor and the gearwheel.

13. The method of claim 12 comprising molding the gearwheel as a plastic injection-molded part onto the steering shaft.

14. The method of claim 12 comprising molding the gearwheel as a plastic injection-molded part onto the steering shaft by at least one of continuous casting or diaphragm gating.

15. The method of claim 12 wherein producing the non-releasable connection comprises welding the sensor to the gearwheel.

16. The method of claim 12 wherein producing the non-releasable connection comprises ultrasonic welding the sensor to the gearwheel.

17. The method of claim 12 wherein producing the non-releasable connection comprises friction welding the sensor to the gearwheel.

18. The method of claim 12 wherein producing the non-releasable connection comprises laser welding the sensor to the gearwheel.

* * * * *